US011615110B2

(12) United States Patent
Gupta et al.

(10) Patent No.: US 11,615,110 B2
(45) Date of Patent: Mar. 28, 2023

(54) SYSTEMS AND METHODS FOR UNIFYING FORMATS AND ADAPTIVELY AUTOMATING PROCESSING OF BUSINESS RECORDS DATA

(71) Applicant: Auditoria.AI, Inc., San Jose, CA (US)

(72) Inventors: Rohit Gupta, Redwood City, CA (US); Adina Florina Simu, Menlo Park, CA (US); Sateesh Valluru, Dublin, CA (US); Tao Tong, Fremont, CA (US)

(73) Assignee: Auditoria.AI, Inc., San Jose, CA (US)

( * ) Notice: Subject to any disclaimer, the term of this patent is extended or adjusted under 35 U.S.C. 154(b) by 0 days.

(21) Appl. No.: 17/234,666

(22) Filed: Apr. 19, 2021

(65) Prior Publication Data

US 2021/0326350 A1 Oct. 21, 2021

Related U.S. Application Data

(60) Provisional application No. 63/011,857, filed on Apr. 17, 2020.

(51) Int. Cl.
*G06F 16/25* (2019.01)
*G06F 16/2452* (2019.01)
(Continued)

(52) U.S. Cl.
CPC ........ *G06F 16/258* (2019.01); *G06F 16/2282* (2019.01); *G06F 16/24522* (2019.01); *G06F 16/24534* (2019.01); *H04L 51/046* (2013.01)

(58) Field of Classification Search
CPC .............. G06F 16/258; G06F 16/2282; G06F 16/24522; G06F 16/24534; G06F 16/906; H04L 51/046; H04L 51/56
See application file for complete search history.

(56) References Cited

U.S. PATENT DOCUMENTS 11,086,827 B1 * 8/2021 Sainanee ............... G06F 16/211
2002/0059425 A1 5/2002 Belfiore et al.
(Continued)

FOREIGN PATENT DOCUMENTS

WO 2021212121 A1 10/2021

OTHER PUBLICATIONS

International Preliminary Report on Patentability for International Application PCT/US2021/028021, Report dated Oct. 13, 2022, dated Oct. 27, 2022, 6 Pgs.
(Continued)

*Primary Examiner* — Albert M Phillips, III
(74) *Attorney, Agent, or Firm* — KPPB LLP

(57) ABSTRACT

Systems and methods for unifying business records data from different database sources into a common format in the same repository are disclosed. In one embodiment, a process includes receiving, by an integration platform system, a first set of business records data from a customer records system, where the business records data includes records in a first format, identifying a first transformation rule corresponding to the first format using the integration platform system, where the first transformation rule includes information for converting data from the first format to a unified format, converting each record in the first set of business records from the first format to the unified format by the integration platform system using the first transformation rule, and storing the first set of converted records in the unified format in a business records database.

5 Claims, 14 Drawing Sheets

(51) Int. Cl.
  *H04L 51/046*    (2022.01)
  *G06F 16/2453*   (2019.01)
  *G06F 16/22*     (2019.01)

(56)           References Cited

U.S. PATENT DOCUMENTS

2005/0080614 A1    4/2005  Bennett
2007/0299885 A1*  12/2007  Pareek ................. G06F 16/254
2011/0167105 A1    7/2011  Ramakrishnan et al.
2013/0124545 A1    5/2013  Holmberg et al.
2014/0330743 A1   11/2014  Ramakrishnan et al.

OTHER PUBLICATIONS

International Search Report and Written Opinion for International Application No. PCT/US2021/028021, Search completed Jun. 11, 2021, dated Jul. 14, 2021, 11 Pgs.

* cited by examiner

SYSTEMS AND METHODS FOR UNIFYING FORMATS AND ADAPTIVELY AUTOMATING PROCESSING OF BUSINESS RECORDS DATA

RELATED APPLICATIONS

The present application claims priority to U.S. Provisional Patent Application No. 63/011,857 entitled "Systems and Methods for Adaptively Automating Business Processes" filed Apr. 17, 2020, the disclosure of which is hereby incorporated by reference in its entirety.

BRIEF DESCRIPTION OF THE FIGURES

FIG. 9 shows JSON code for an example smartflow in accordance with several embodiments of the invention.

Figure 14:
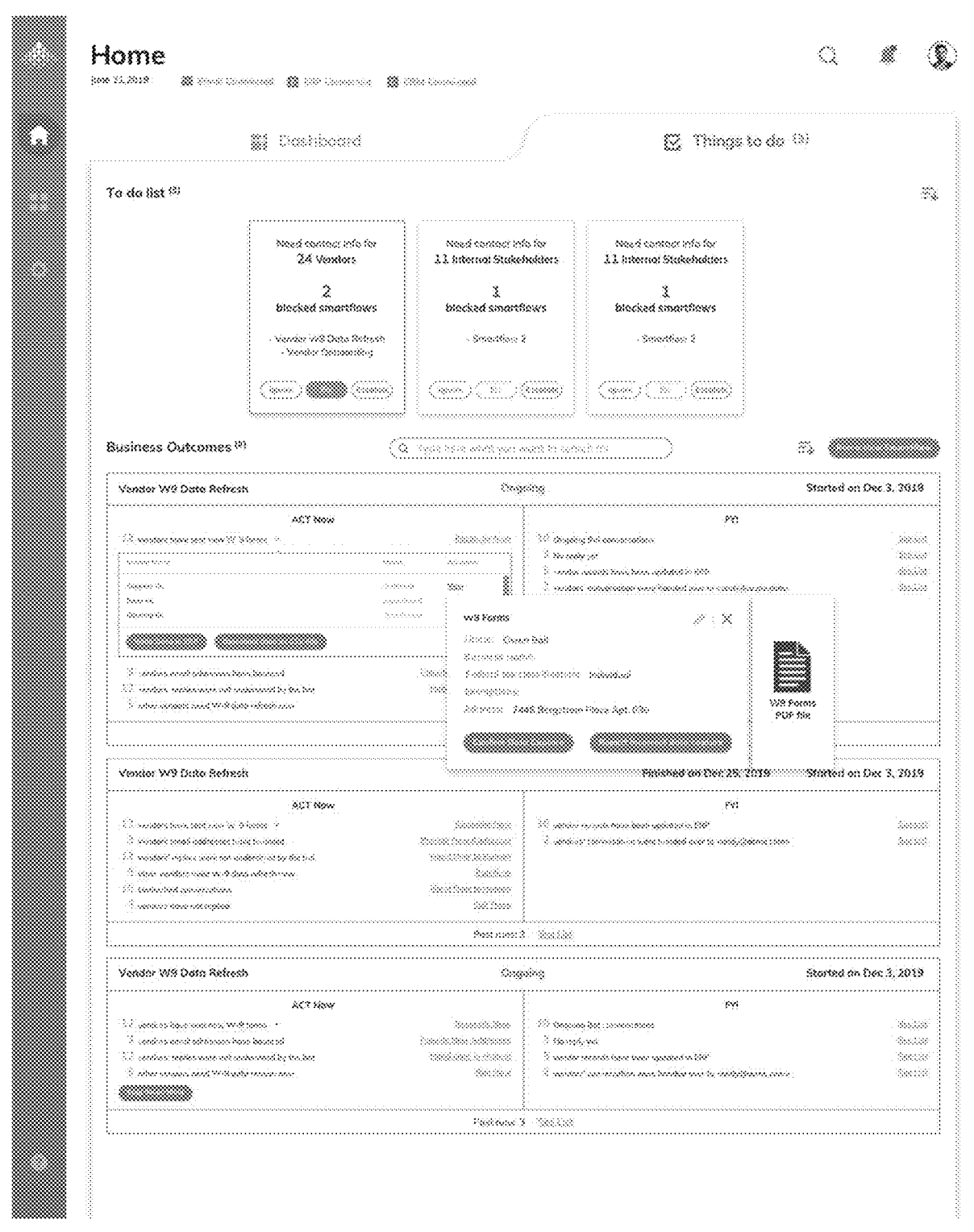

FIGS. 11-14 show graphical user interface screens for interacting with an integration platform system in accordance with several embodiments of the invention.

DETAILED DISCLOSURE OF THE INVENTION

Figure 1:
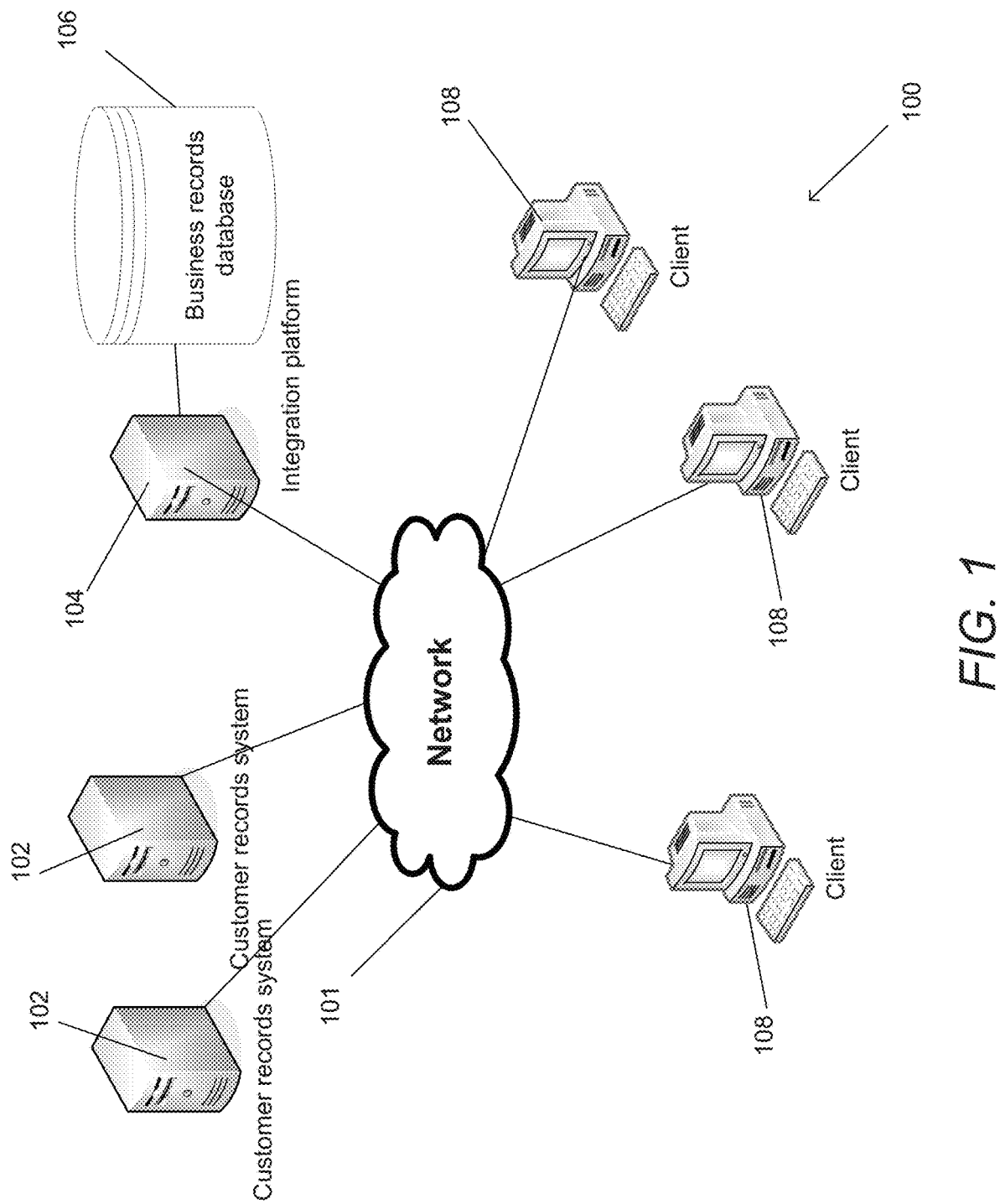
FIG. 1 illustrates an autonomous business records processing system in accordance with several embodiments of the invention.

Turning now to the drawings, systems and methods for autonomously processing business records data, which can support performing back office business functions, in accordance with embodiments of the invention are disclosed. A number of modern tools and services are available for businesses to collect and manage business data, such as accounts receivable transactions, inventory, employee information, and so on. Some of these services form categories such as Customer Relationship Management systems (CRM) (such as, but not limited to, Salesforce, Zendesk, etc.), Enterprise Resource Planning systems (ERP) (such as, but not limited to, Sage Intacct, Oracle NetSuite, etc.), and others. However, considerable human effort by employees in various roles such as auditors, accounts receivables clerks, financial analysts is necessary to turn the business data into actionable and/or presentable forms such as reports (e.g., auditing, cashflow forecasts, etc.). Moreover, the business data often is drawn from disparate sources and exists in various forms. These task workflows may be implemented differently at different businesses but can follow general common principles.

Systems and methods for automating business processes in accordance with many embodiments of the invention provide a unified system that integrates business data from different sources into a single format. A central integration platform orchestrates collection of business data from various sources and performs tasks using the business data to provide services in an automated hands-off manner. In several embodiments, the collected business data is stored in an unstructured database. Data objects from different sources can have different structure, fields, and/or associated metadata. The integration platform can translate the data objections into a common format stored in an unstructured manner to unify the datasets.

The central integration system can present a uniform interface (for example, via a mobile application or web interface) to a user to capture natural language input (e.g., textual or spoken audio) that describes a task to perform. This described task can be transformed into a smartflow that defines the task in a common language. In some embodiments, a smartflow can be a programmatic expression of a process to be performed that can be associated with a particular customer account or customer system and information pertaining to that customer account or customer system. The smartflow breaks down the task into steps and the information that is used to carry out the steps. It can assign workers (lower level automations) to gather information and orchestrates the bots to perform the steps to completion. In several embodiments, workers can scale horizontally to cover multiple customers, can run continuously until stopped, and can be spawned as scheduled. As will be discussed further below, a smartflow can be implemented as a state model or state machine executing on a computing platform, such that it performs tasks to collect and process data and maintains an awareness of state.

In several embodiments of the invention, executing smartflows can involve interactions with external parties. For example, a business may wish to update tax information for a set of suppliers. The integration platform can identify suppliers from business records data retrieved from ERP systems and electronically send W-9 forms to be completed, for example, by email. Forms can be returned, for example, by email, and the information extracted either digitally or by optical character recognition (OCR).

Integration platforms in accordance with embodiments of the invention can also perform additional routine checks and reports, such as, but not limited to, audit readiness, detecting financial irregularities, and calculating vendor risk. This can all be enabled by collecting business records data and running adaptive automated processes.

The system may be implemented in a variety of ways, including dedicated computer hardware and software or distributed architectures such as infrastructure tools available to automated web services. In many embodiments of the invention, a system for automating business processes includes applications executing on one or more hardware platforms, user interface components displayed by one or more hardware platforms, and data warehouses stored on one or more hardware platforms. Such hardware platforms may include at least a processor and non-volatile memory containing instructions directing the processor to perform processes such as those described below.

System Architecture

Components of a system for automating business processes in accordance with embodiments of the invention can include software applications and/or modules that configure a server or other computing device to perform processes as will be discussed further below. A system including customer records systems 102, integration platform 104, and client devices 106 communicating over a network 101 as illustrated in FIG. 1. As mentioned further above, information in the form of business records data can be obtained by the integration platform 104 from customer records systems 102. While customer records systems 102 are illustrated as single entities here, it is understood that data sources and data stores be implemented in many forms, such as distributed systems or cloud services. Records provider systems can include Customer Relationship Management (CRM) systems (such as, but not limited to, Salesforce, Zendesk, etc.), Enterprise Resource Planning (ERP) systems (such as, but not limited to, Sage Intacct, Oracle Netsuite, etc.), single sign on (SSO) and identity and access management (IAM) systems (such as, but not limited to, Microsoft and Okta), revenue recognition systems (such as, but not limited to, Revsym, Model N, and Zuora), payroll systems (such as, but not limited to, Intuit and ADP), and vendor management tools, as well as other that provide and mange business information. These can be treated as integration data sources for obtaining records data. The data can be moved using any of a variety of available mechanisms, such as using such as Application Programming Interfaces (API).

The integration platform in turn stores business records data and other information in a database repository 106. As will be discussed below, business records data may exist in many different forms and formats. Systems in accordance with embodiments of the invention can unify business records data to a single format as stored in a database.

Users may access an interface to the integration platform 104 using client devices 108, which can be any of a variety of computing devices, such as personal computers, mobile devices or phones, or tablets. As will be discussed further below, a user interface on such devices can be used for tasks such as to create and request execution of smartflows, to view information, and generate reports.

Figure 2:
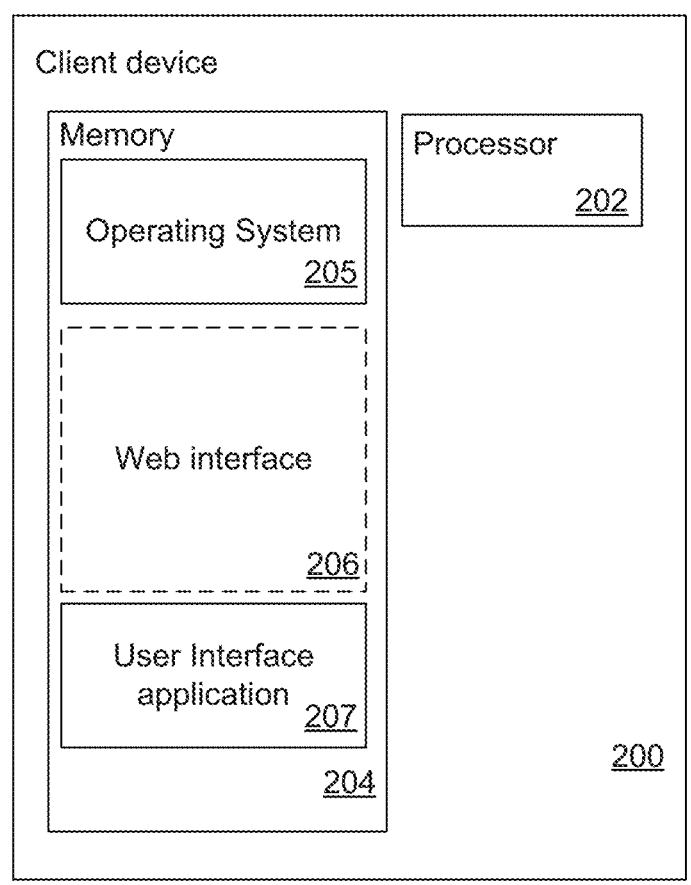
FIG. 2 conceptually illustrates a client device in accordance with several embodiments of the invention.

A client device in accordance with embodiments of the invention is conceptually illustrated in FIG. 2. The client device 200 includes a processor 202 and memory 204 that includes an operating system 205, web interface 206 and user interface application 207. The user interface application 207 can configure or direct the processor to perform or execute processes such as those described further below with respect to creation of smartflows.

Figure 3:
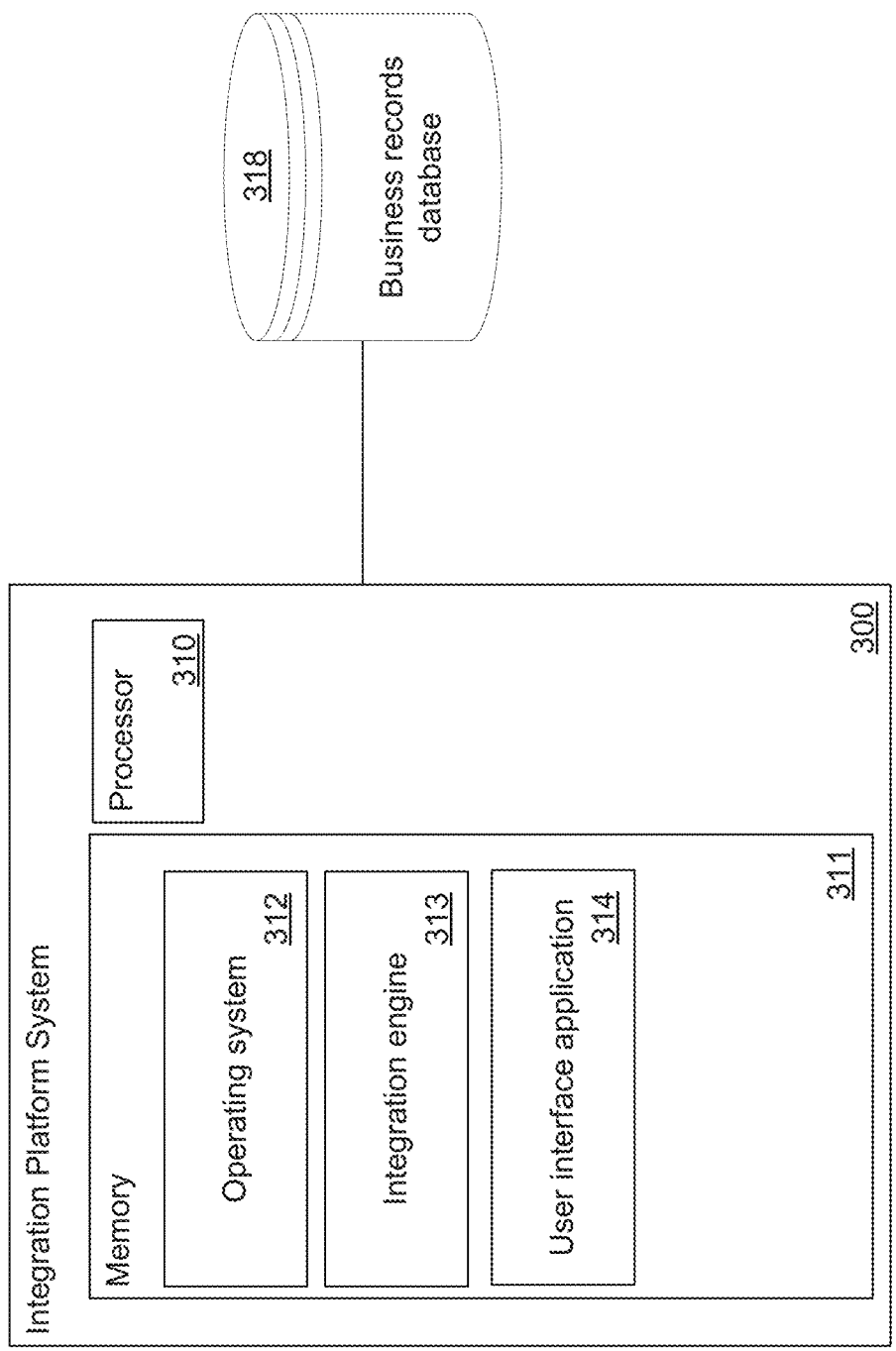
FIG. 3 conceptually illustrates an integration platform system in accordance with several embodiments of the invention.

An integration platform in accordance with embodiments of the invention is conceptually illustrated in FIG. 3. The integration platform 300 includes a processor 310 and memory 311 that includes an operating system 312, transformation engine 313, and user interface application 314. The transformation engine 313 can configure or direct the processor to perform or execute processes such as those described further below with respect to normalizing business records data. The integration platform can also access a business records database 318 that stores business records data. One skilled in the art will recognize that an integration platform may be implemented using other computing architectures, for example, as a virtual machine, as a cluster of computers, or using a cloud computing service.

Further embodiments of the invention incorporate e-mail systems. While e-mail systems were traditionally designed for communication, over time, companies have been using e-mail as a tool for workflow wherein they seek approvals, recommendations and decisions. Additionally, e-mail systems can also serve as a data hub for evidentiary data storage as requested for audits and other assurance activities. Illustrative examples of these include approvals for payment reimbursement extensions, decisions to allow clients to split their payments into installments, provide evidence of receipt of goods and services and more. Systems in accordance with embodiments of the invention can leverage technologies including natural language processing (NLP), natural language understanding (NLU), and/or optical character recognition (OCR) along with an ephemeral state machine that can serve as a workflow orchestration engine. By tapping into e-mail systems (such as, but not limited to, Google G Suite and Microsoft Office365) automation flows can be executed across several business processes, while interpreting business context, extracting data from unstructured content, and reconciling them into enterprise applications in the context that enterprises expect. In several embodiments, e-mail data and metadata may be drawn in similar fashion to other types of business records data as discussed below.

Although specific system architectures for automating business processes is described above with reference to FIGS. 1-3, one skilled in the art will recognize that any of a variety of architectures may be utilized in accordance with embodiments of the invention.

Transformation Engine

The transformation engine can include a service model and library to facilitate transformation of data, such as processes described further below that can receive business records data in different formats from different sources and consolidate them in a single format. The library can include specifications referred to as data definitions and transformation rules stored in a database.

In many embodiments of the invention, business records data can include information delimited as records, where each record is an item of information, such as an invoice, a vendor record, a payment, etc. Each record can include data values in fields. For example, an invoice can have fields such as an account number, payee name, invoice number, invoice date, invoice amount, etc. A vendor record can have fields such as a vendor name, vendor address, tax identifier, contact person name, etc.

In several embodiments of the invention, data definitions describe the representation of records in a unified format, such as the fields that are included and how data within those fields should be treated by the system. Some fields that may be included in various embodiments of the invention are listed below:

Namespace—a title given to a symbolic grouping of records, so that an identical name can be distinguished. For example, a field name of "Name" can have different meanings depending on the context (e.g., an employee or customer name, a vendor name, etc.). With a namespace title of "vendor," the "Name" field can be distinguished for vendors in contrast to names of people that may be customers or employees.

FieldName—the name of the field (e.g., "Name")

FieldType—the type of data expected to be within the field, e.g., string, number, etc.

Default—whether the field is a default field

Searchable—whether data in the field is searchable

Lookup—whether data in the field can be in a lookup table

Masked—whether the data values should be masked when shown in a user interface (e.g., shown generic characters instead of the values)

DisplayGroup—can describe how to group data in a user interface

DisplayName—can describe how the name of the field should be displayed in a user interface DisplayNameTranslations—can contain how the field name can be displayed in different languages Instruction—can contain instructions for how the field can be used in generating outputs, e.g., how to construct content of an email around where the data values of a field are inserted ValidationRule—can contain rule(s) for how to validate whether data in the field is correct (e.g., number of characters, social security numbers should have nine digits, etc.)

In many embodiments of the invention, transformation rules can specify how to change business records data from a source format into a unified format. In several embodiments, each record of a transformation rule can include any or all of the following fields: key, operation, type, and/or format. Key can serve as a name or identifier to indicate the purpose for the rule (e.g., a particular vendor for an inbound data flow or a particular workflow for an outbound data flow). Operation can indicate an operation to perform on the data when the transformation rule is carried out (e.g., decode, encode, csv, etc.). Type can indicate the source for an inbound data flow or the destination for an outbound data flow (e.g., what type of ERP system). Format can indicate the expected source format of the business records data from the data source (e.g., REST, SOAP, SuiteQL, etc.).

Figure 4:
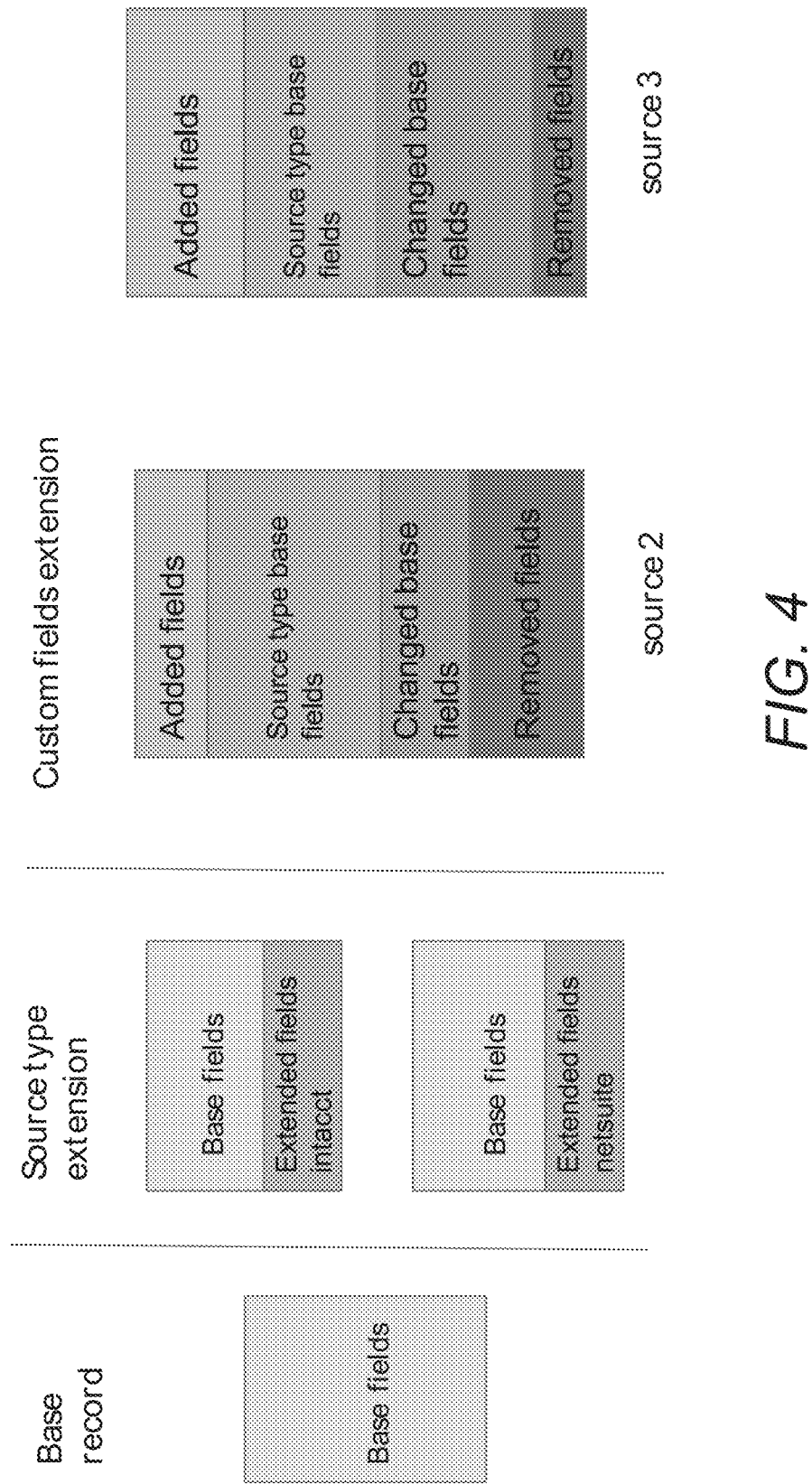
FIG. 4 conceptually illustrates an example of modifying fields of source data to a unified format in accordance with several embodiments of the invention.

An example of adapting two source formats to the unified format is conceptually shown in FIG. 4. "Base fields" can refer to fields that are common to the source formats and that can be imported into the unified format without change.

"Added fields" can refer to fields that are added to supplement the records with additional data (e.g., data that may be present in records of another source format but not this source format).

"Source type base fields" can refer to base fields that are already present in data from that source.

"Changed based fields" can refer to fields where the source data is changed into the unified format.

"Removed fields" can refer to fields that are removed from the source data and not brought into the unified format.

Figure 5:
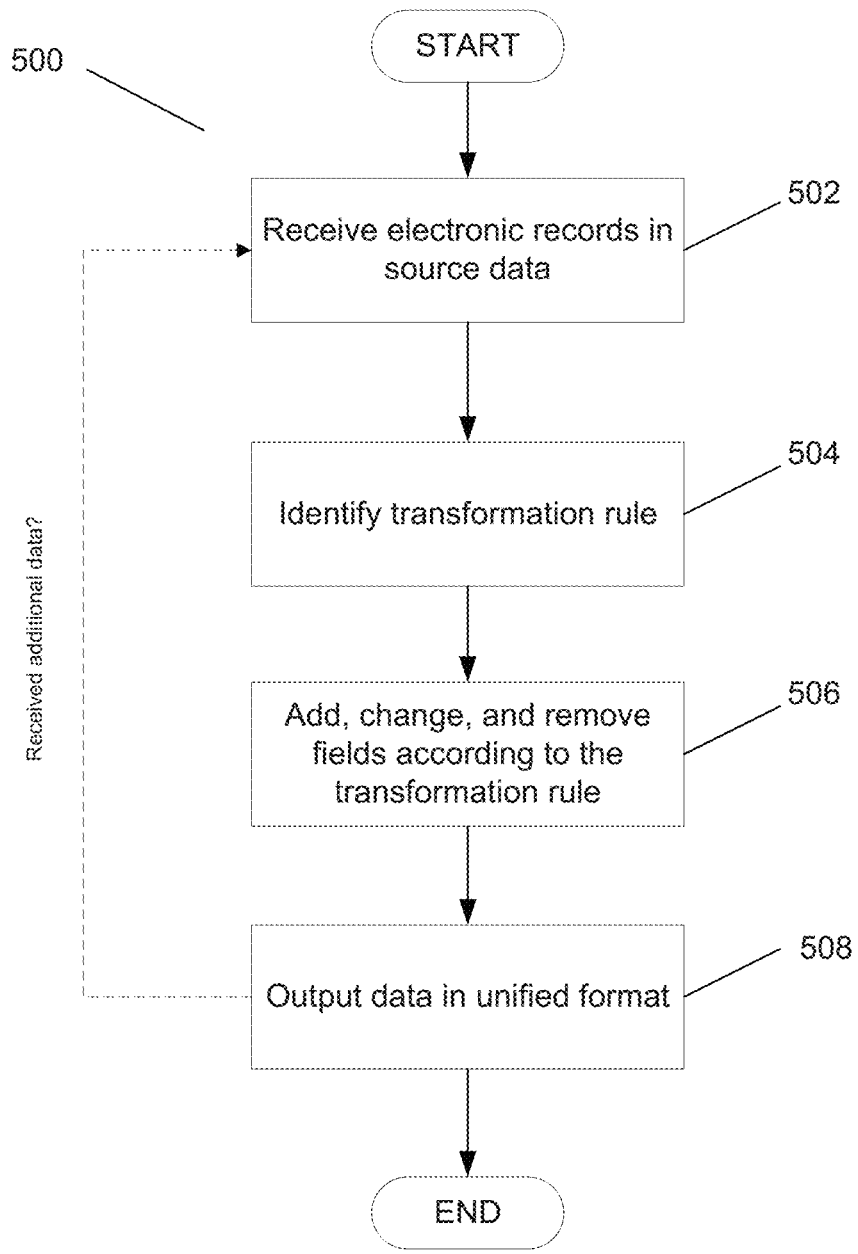
FIG. 5 illustrates a process for transforming electronic business records in source data to a unified format in accordance with several embodiments of the invention.

A process for applying a transformation rule to source data using a transformation engine in accordance with several embodiments of the invention is illustrated in FIG. 5. The process 502 includes receiving a set of source business records data from a customer records system. In several embodiments, the business records data includes information that can be formatted as tables of data values with fields as headings and/or information in emails or electronic documents (e.g., PDFs) where fields can be recognized and data values extracted from the locations of the fields.

An appropriate transformation rule that corresponds to the source format of the source data from the customer records system is identified 504. For each record in the set of business records data, the process includes recognizing which fields are source type base fields using the identified transformation rule and bringing them in to the unified format without changing the data. The process identifies 506 fields that should be added according to the identified transformation rule and adds them with appropriate data. The process identifies fields that should be changed according to the identified transformation rule and changes the data in those fields for the uniform format. The process identifies fields that should be removed according to the identified transformation rule and removes those fields.

The process can be repeated for a second set of source data, e.g., from another data source (customer records system). In several embodiments, the second set of source data is in a second format or utilizes a different communication protocol from the first set of source data. Accordingly, a different transformation rule may be applied to the second set of source data as appropriate to that format or communication protocol.

Although a process is described above with respect to FIG. 5, one skilled in the art will recognize that any of a variety of processes may be utilized in accordance with embodiments of the invention.

Collecting and Unifying Business Records Data

Many databases, including typical records provider systems mentioned further above, are relational databases with information stored in tables and organized within columns. This structure imposes rigidity and can be difficult to adapt when integrating data from multiple systems. For example, customers may have data stored at different enterprise resource planning (ERP) systems, such as SAP, NetSuite or Sage Intacct. The data from different sources may not be easily combined. Those ERP systems may store the data in different formats or may require different application communication protocols or APIs to access the data, such as SOAP (Simple Object Access Protocol), REST (REpresentational State Transfer), or SuiteQL. Moreover, such systems typically do not capture data at a granularity (e.g., a frequency or a level of detail) that is useful for machine learning and artificial intelligence processes.

In many embodiments of the invention, business records data (e.g., payments, invoices, etc.) from different data sources (records provider systems), which may be in different source formats, can be normalized by converting it to a single representation of a common data model, referred to here as a unified format, by a transformation engine in the integration platform. This conversion can be referred to as an inbound data flow. Converting data from the unified format to an output format (e.g., for exporting back to an ERP system, generating reports for a user interface, etc.) can be referred to as an outbound data flow. The transformation engine can include a service model and library to facilitate transformation of data. The library can include specifications referred to as data definitions and transformation rules.

Entities that interact can be represented by generic schemas at the database layer. In some further embodiments, a platform-independent standard language such as Extensible Business Reporting Language (XBRL) is used to express information and logic of business records data. Business records data can be stored in either XML or JSON schema representation in a central data store. Any of a variety of database types can be used for the central datastore, such as, but not limited to, Cassandra, MySQL, and Neo4J.

In many embodiments of the invention, the transformation engine in the integration platform maintains a bidirectional mapping to convert data format of certain records provider systems into others. For example, in a third normal form (3NF) of data modeling, attributes can be represented as a column and relations in sets of tables using JSON or similar language as a payload to describe the data in a schema-less fashion. In some further embodiments, additional data is added in the unifying process in order to facilitate machine learning and/or artificial intelligence processes to be performed on the data.

Some additional processes may be utilized to convert data from the unified format to a source format. This conversion can be referred to as an outbound data flow.

Conversational intent detection on interactions with records provider systems can be performed in multiple stages. The integration platform can learn programmatically the rules and circumstances of how to interface with records provider systems to obtain business records data. Canonical definitions of objects and entities in business records data may differ from one records provider system to another, or may change with additional versions of a particular system over time. In some instances, it may be desirable to avoid hard coding decision statements such as for loops and if statements, however they can accommodate expressions provided for natural language processing (NLP) if necessary.

Figure 6:
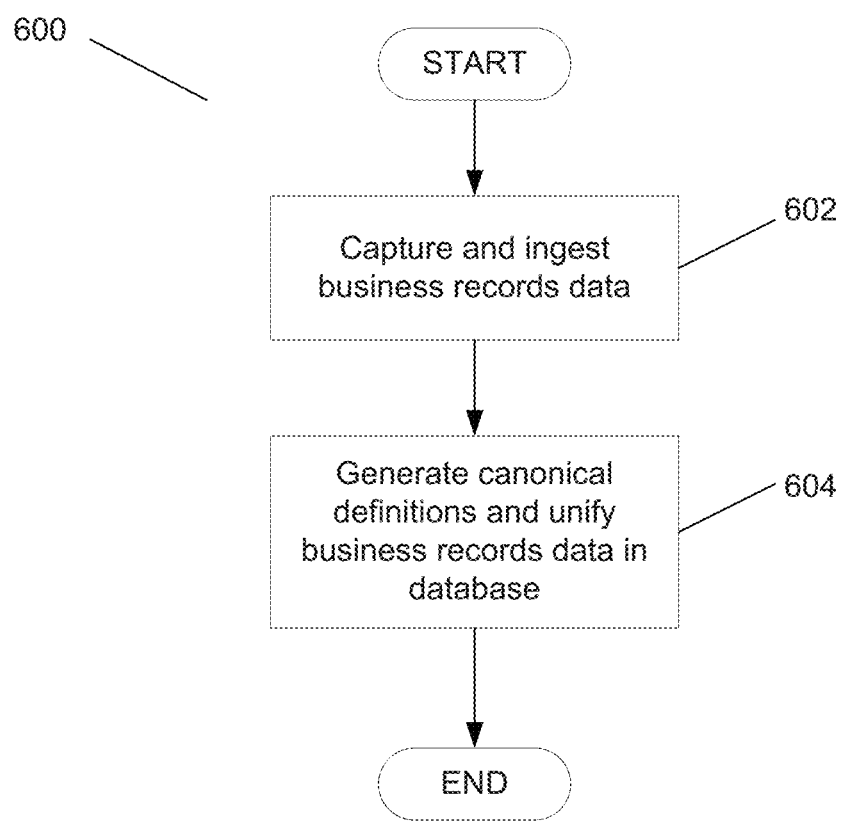
FIG. 6 illustrates a process for unifying business records data into a database repository in accordance with several embodiments of the invention.

A process for normalizing business records data in accordance with embodiments of the invention is illustrated in FIG. 6. The process 600 includes capturing and ingesting (602) business records data. The transfer can be performed, for example, using APIs. In several embodiments, at least some data sources are enterprise resource planning (ERP) systems. The process then generates canonical definitions and unifies (604) the business records data in a business records database.

Further embodiments of the invention include receiving and unifying additional business records data. Additional sets of data can be received from the same and/or other data sources. A second set of business records data is received.

Although a specific process for unifying business records data into a single format is described above with respect to FIG. 6, one skilled in the art will recognize that any of a variety of processes may be utilized in accordance with embodiments of the invention. Such processes may be performed using hardware such as an integration platform as discussed further above.

Processes for Adaptively Automating Business Processes

Figure 7:
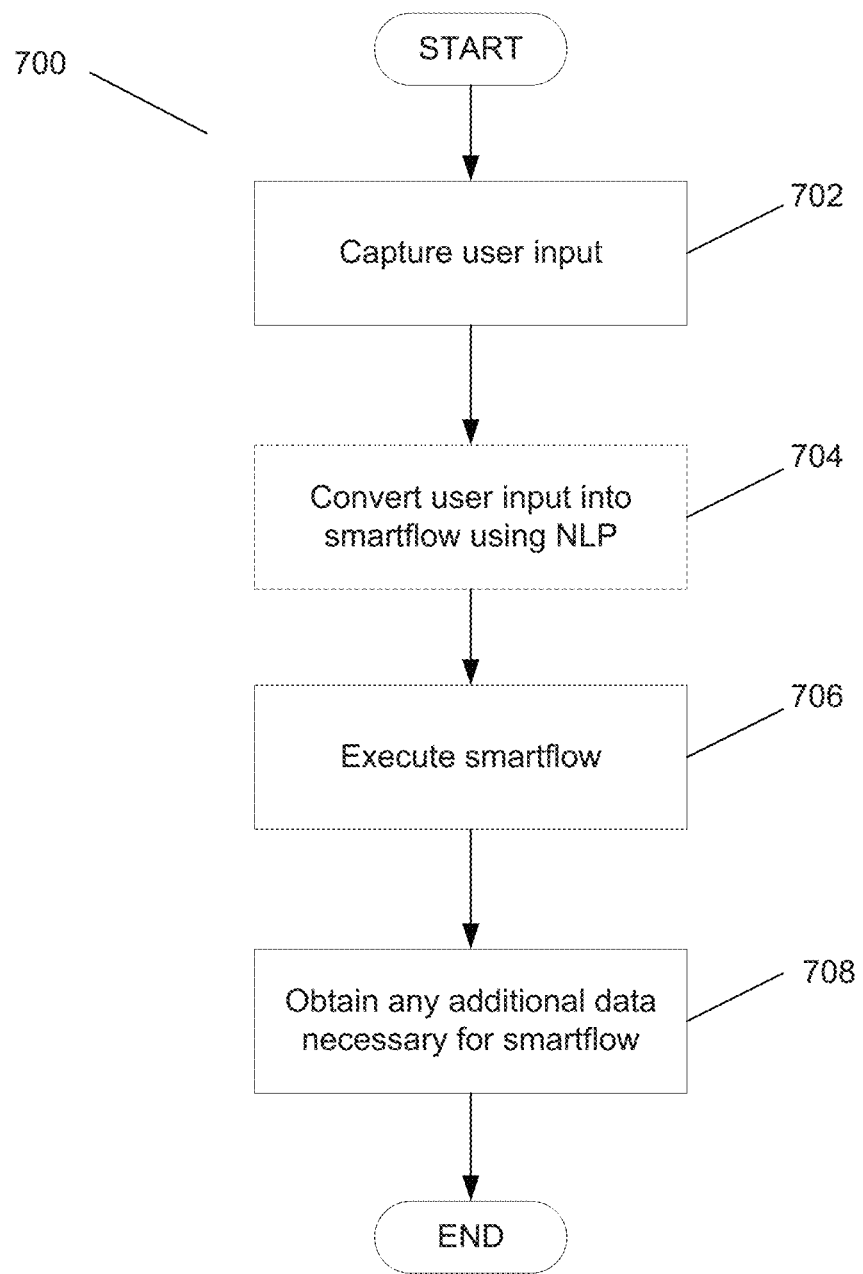
FIG. 7 illustrates a process for creating and executing a smartflow in accordance with several embodiments of the invention.

A process for autonomously analyzing business records data to perform a business process in accordance with embodiments of the invention is illustrated in FIG. 7. The process includes capturing (702) an expression of a business process in text or audio. In many embodiments, the business process can be described in natural language as typed by a user into a user interface. For example, a user interface console can be provided on a webpage or in a dedicated application.

The text or audio is parsed and interpreted (704) using natural language processing (NLP) to generate a state model where the initial state expresses what information was provided, what information is known, and what information is still needed. Different approaches may be utilized to determine rules for the state model. In several embodiments, the input text is decomposed into units that can be recomposed based on need. A simple example is an item that requires the approval of a particular person.

The NLP process may parse the text or audio to create rules that govern the transition from one state to another based on additional interactions. For example, a state may require validating the fields of a form to check that they are completed correctly (e.g., fields have valid values, only one of a group of checkboxes is filled, etc.). If there are inconsistencies or unacceptable entries, the state can transition to a state that deals with such an error, for example by returning the form to the other party and providing a message directing to the problematic areas of the form. Such errors states may be repeated for a predetermined number of times to attempt to have the other party correct the error. After the number of tries is exhausted, these errors may result in escalation for review by a human user. Similarly, other types of errors that are not contemplated or unresolvable can be escalated.

When the state model is executed (706), the process accesses the records data to be utilized. The records data may already be present in the business records database 106 or additional records data may be retrieved (708). As discussed further above, records data (e.g., payment, invoice, etc.) may be in different formats, for example, from different provider systems (e.g., ERP providers, electronic health records, etc.). The records data is converted into a single view to remove characteristics that are specific to the provider systems (e.g., column length/type, etc.) and change metadata to common meanings. In several embodiments, the conversion incorporates machine learning or other adaptive or manual learning techniques to account for the format of records data potentially changing over time. Some vendors may update their systems anywhere from two to four times a year, so there can be new data objects or changes to existing data objects. For example, cohort analysis may be utilized in data ingestion to learn relationships.

Figure 8:
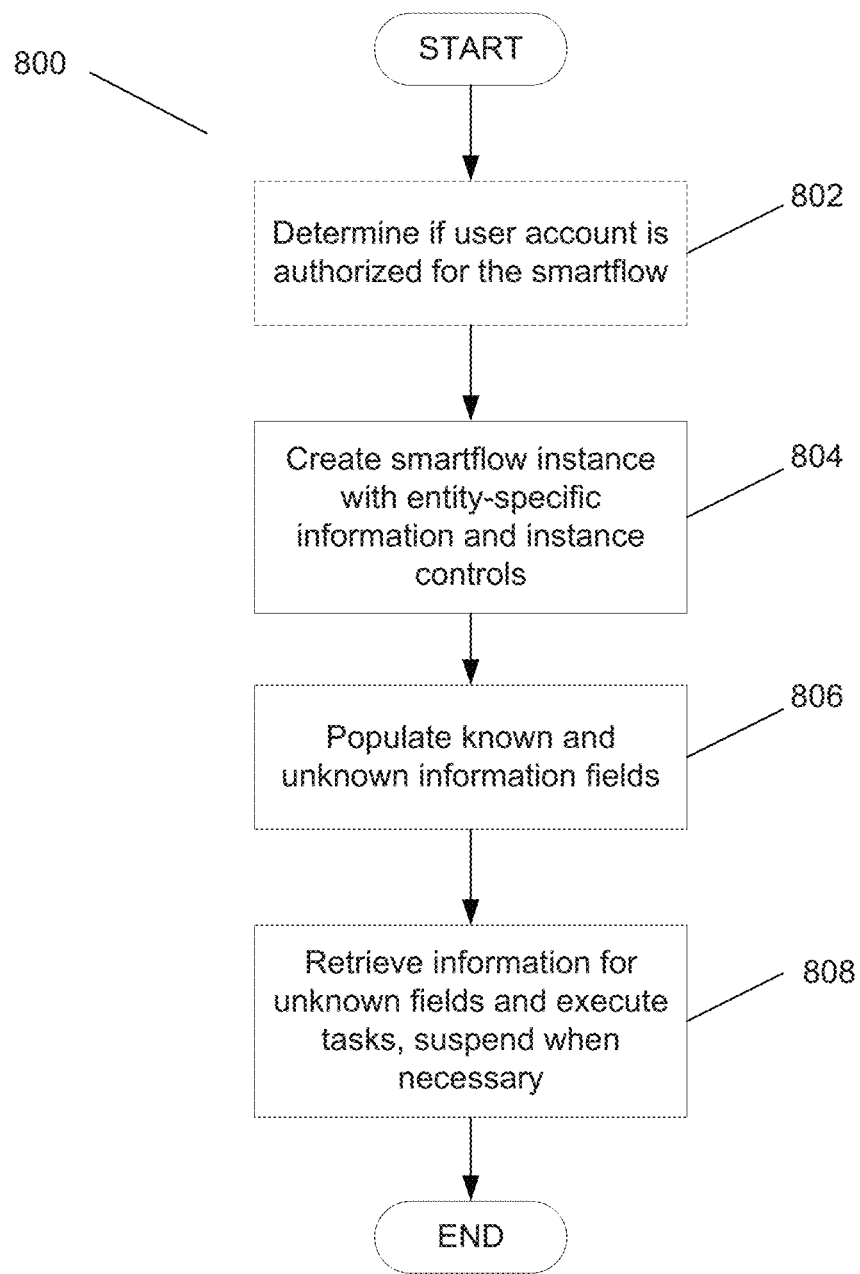
FIG. 8 illustrates a process for executing a smartflow in accordance with several embodiments of the invention.

A process for executing a smartflow in accordance with another embodiment of the invention is illustrated in FIG. 8. The process 800 includes receiving 802 a smartflow execution request from a user account and determining if the user account that is initiating the smartflow is authorized to do so. For example, the user account may be assigned to a role that has permissions to execute the smartflow.

The process includes creating 804 a smartflow instance. In some embodiments, this can include starting a microservice (e.g., using a virtual machine or serverless application). Several embodiments utilize AWS (Amazon Web Services) Step Functions as a microservice for smartflows. AWS Step Functions provides SDKs (software development kit), APIs (application programming interface), and integrations with the AWS ecosystem. The smartflow instance is provided with entity-specific information and instance controls.

Figure 10:
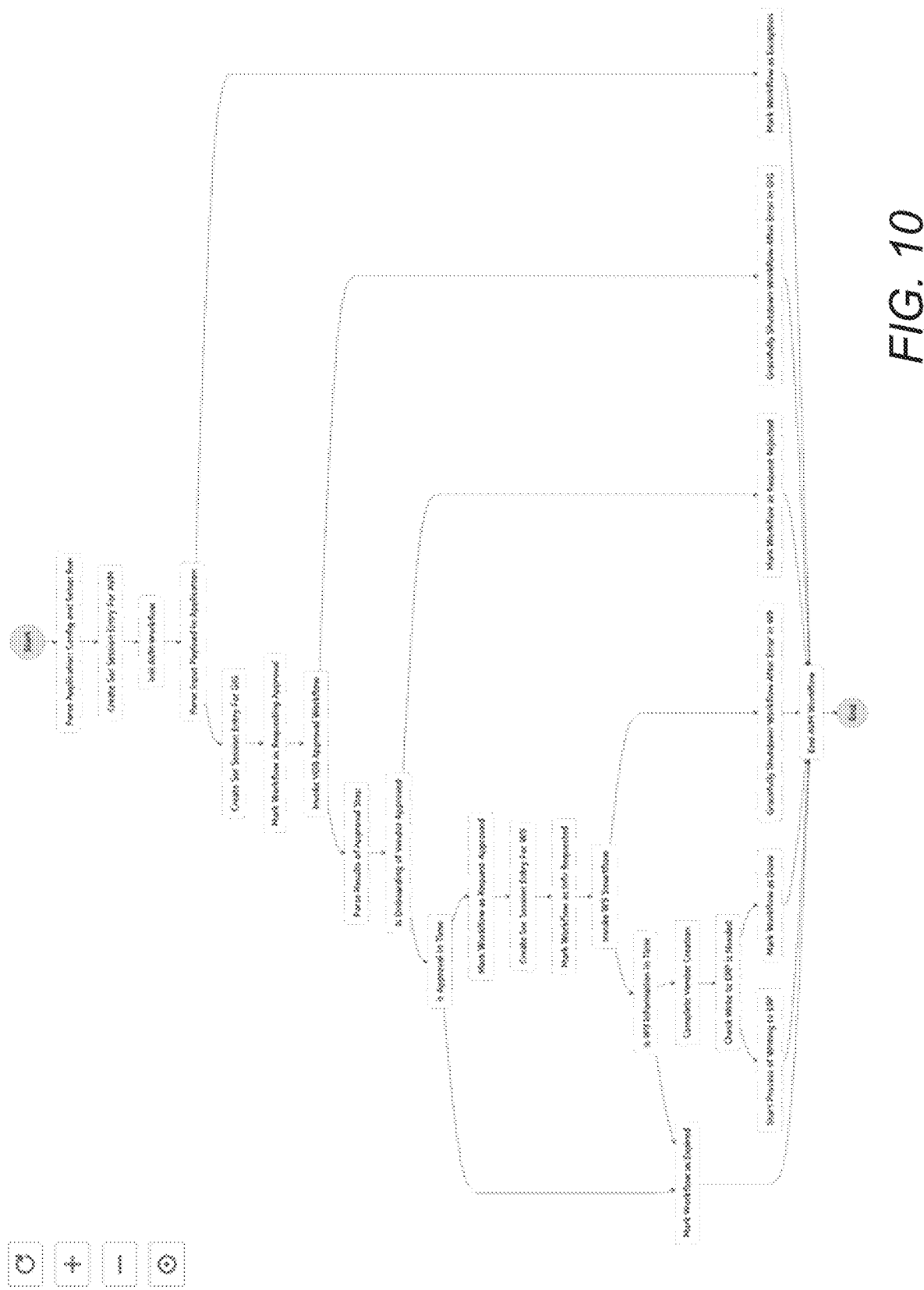
FIG. 10 shows a visual flowchart for an example smartflow in accordance with several embodiments of the invention.

In some embodiments of the invention, a smartflow may be expressed in JSON format. A smartflow can also be visualized as a flow chart. Part of an example smartflow for onboarding vendors in accordance with an embodiment of the invention is shown in JSON in FIG. 9. A visual flowchart of the example smartflow in accordance with an embodiment of the invention is shown in FIG. 10.

Returning to FIG. 8, the process populates 806 information fields that are used by the smartflow. Some information fields may be known (e.g., that can be retrieved from the business records database) and some information fields may be unknown (e.g., that can be retrieved from an external source, ERP system, etc.). A variety of techniques, including those discussed further above, may be utilized to retrieve information to populate the information fields in accordance with embodiments of the invention.

The data corresponding to unknown fields are retrieved 808 and tasks encoded into the smartflow are executed according to the state machine. In several embodiments of the invention, at least two mechanisms may be utilized to obtain data for the information fields. First, an email notification service may construct one or more emails to recipients that may have the desired data. Several embodiments utilize natural language models to generate an email, which can be based on features such as the smartflow state, smart templates, rendering, etc.

The email notification service can then listen for a response. When a response is received, an intent detection process can be performed to match the response to the smartflow that is expecting it (e.g., when there are multiple smartflows). The intent detection process may utilize natural language processing as part of the matching to determine the purpose of the received email (e.g., send or receive information, dispute an issue, etc.).

The data can be extracted from the email response text and attached documents (e.g., using language model intent detection, natural language processing, OCR, and/or various information extraction techniques), matched to standard data records, and provided to the smartflow. Certain embodiments of the invention can include email exchanges that are completely automated without human intervention. Such email exchange processes can include email generation, incoming email intent parsing, information extraction, and record updating by, for example, the integration platform. Other embodiments may integrate human review, approval, and/or information seeking into the smartflow through a user interface. For example, an email request may be sent for supervisor/manager approval, to request an invoice copy, etc.

Second, an ERP record query can be sent to an ERP system that may have the desired data. The ERP system can respond to the query with the requested records.

Any tasks that are encoded into the smartflow are performed according to the state model of the smartflow. In some embodiments of the invention, tasks can include a numerical/quantitative analysis performed using data in the information fields. For example, a smartflow may produce a cashflow forecast using a backend process to generate the forecast and report it out to a user. Other tasks can include reading or writing to customer ERP systems. In further embodiments of the invention, smartflow modules can group certain related functionality in subflows. The smartflow modules can replicate across different smartflows where similar functionality is used.

Although certain processes are discussed above with respect to FIGS. 5-8, one skilled in the art will recognize that any of a variety of processes may be utilized in accordance with embodiments of the invention. Such processes may be performed using hardware such as an integration platform as discussed further above.

Example Smartflows

Smartflows in accordance with embodiments of the invention can include many different applications. Some may issue recommendations, check compliance reports for labor violations, anticipate deadlines for acquiring financial information for tax reporting, and many other business processes that typically involve considerable time and effort by the responsible personnel. Examples of user interface screens for a smartflow for collecting and calculating invoice accruals from vendors in accordance with an embodiment of the invention are illustrated in FIGS. 11-14. The screens show information that may be presented to a user and configuration for processes that may be performed by a computer to carry out the smartflow.

Figure 11:
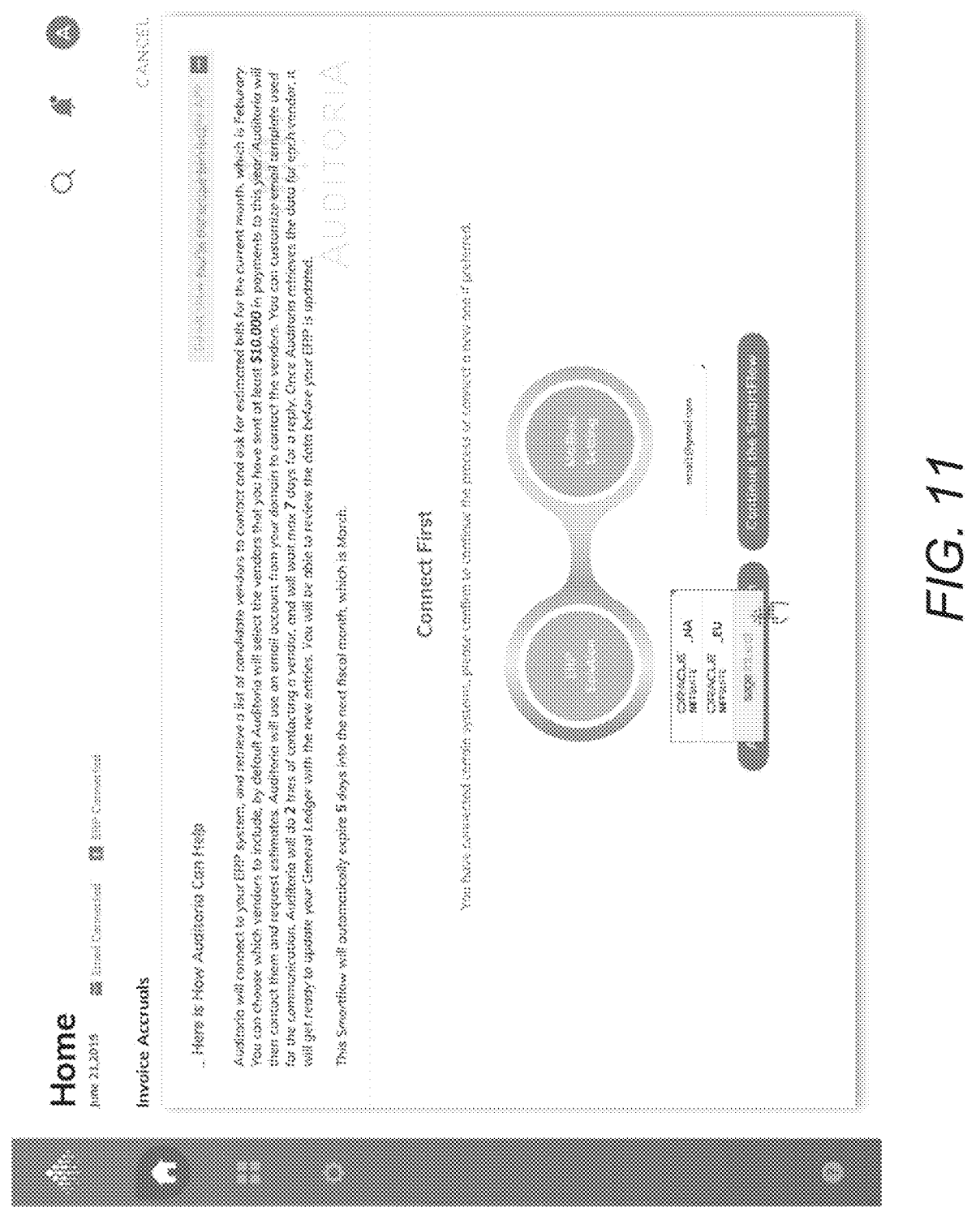

The first screen in FIG. 11 shows a brief description of the smartflow process to be performed, that is in this example, retrieving invoice estimates from a selected list of vendors using an email template and entering data received in responses into the general ledger. Some configuration elements may be changed by a user, such as ERP system to be used, thresholds and/or criteria for which vendors to select, mailbox to be used, number of tries, waiting time, and/or expiration of the smartflow. The settings are saved by the process in memory for use in performing later actions in the process. In several embodiments, the vendor list includes names and email addresses of vendor accounts retrieved from an ERP database or similar system storing information about resources available to a business.

Figure 12:
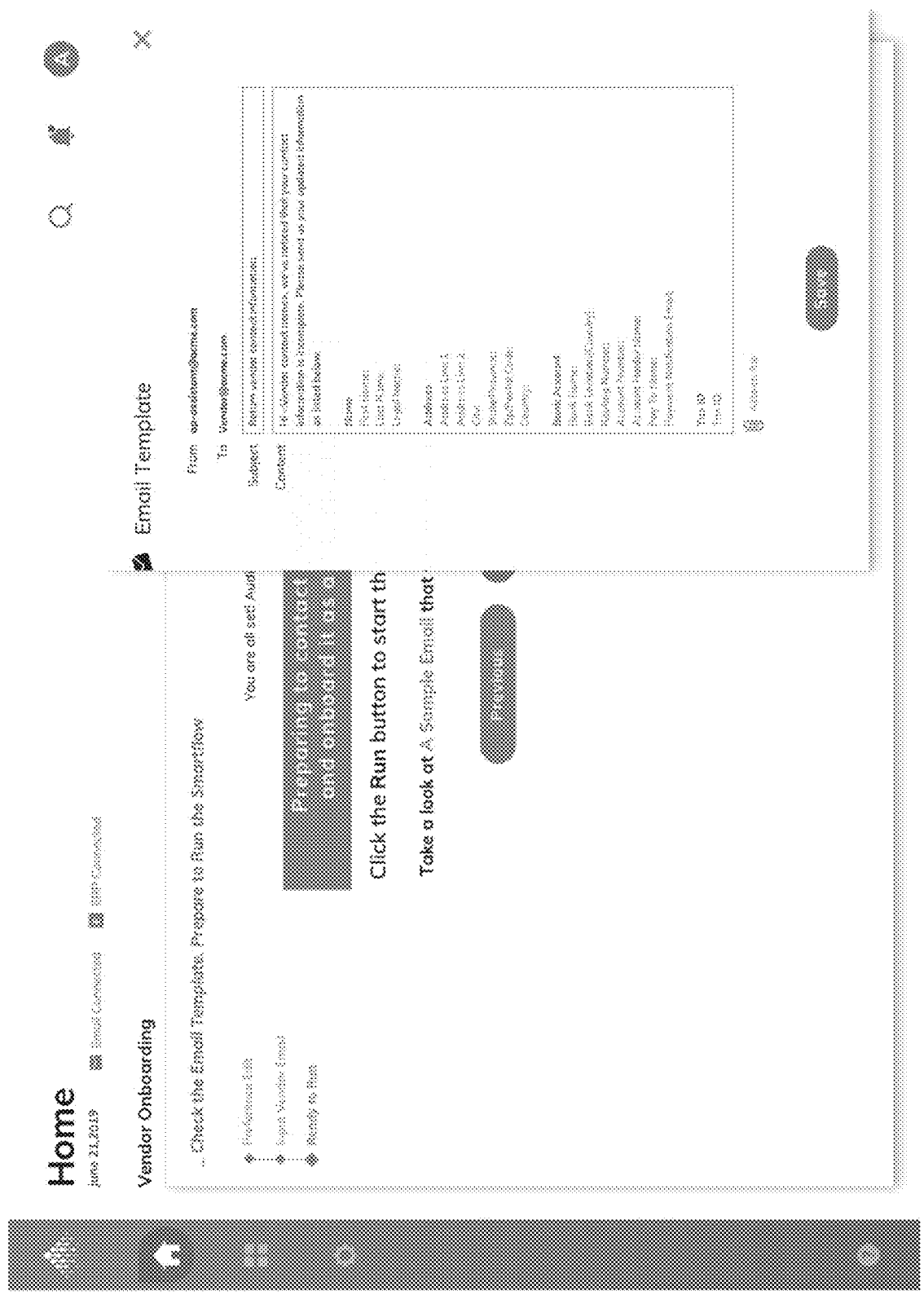

The next screen shown in FIG. 12 shows an email template that will be sent to vendor accounts with fields to be filled out. The fields can be verified and updated by user input. Upon proceeding, the process sends emails formatted according to the email template to the vendor accounts that have been identified according to the thresholds and/or criteria. After the predetermined waiting period and repeat emails are sent if configured to do so, data (such as name, tax ID, bank account, balance amount) is extracted from returned emails and entered into the system. Estimated or actual invoice accruals can be calculated and entered in to the general ledger.

Figure 13:
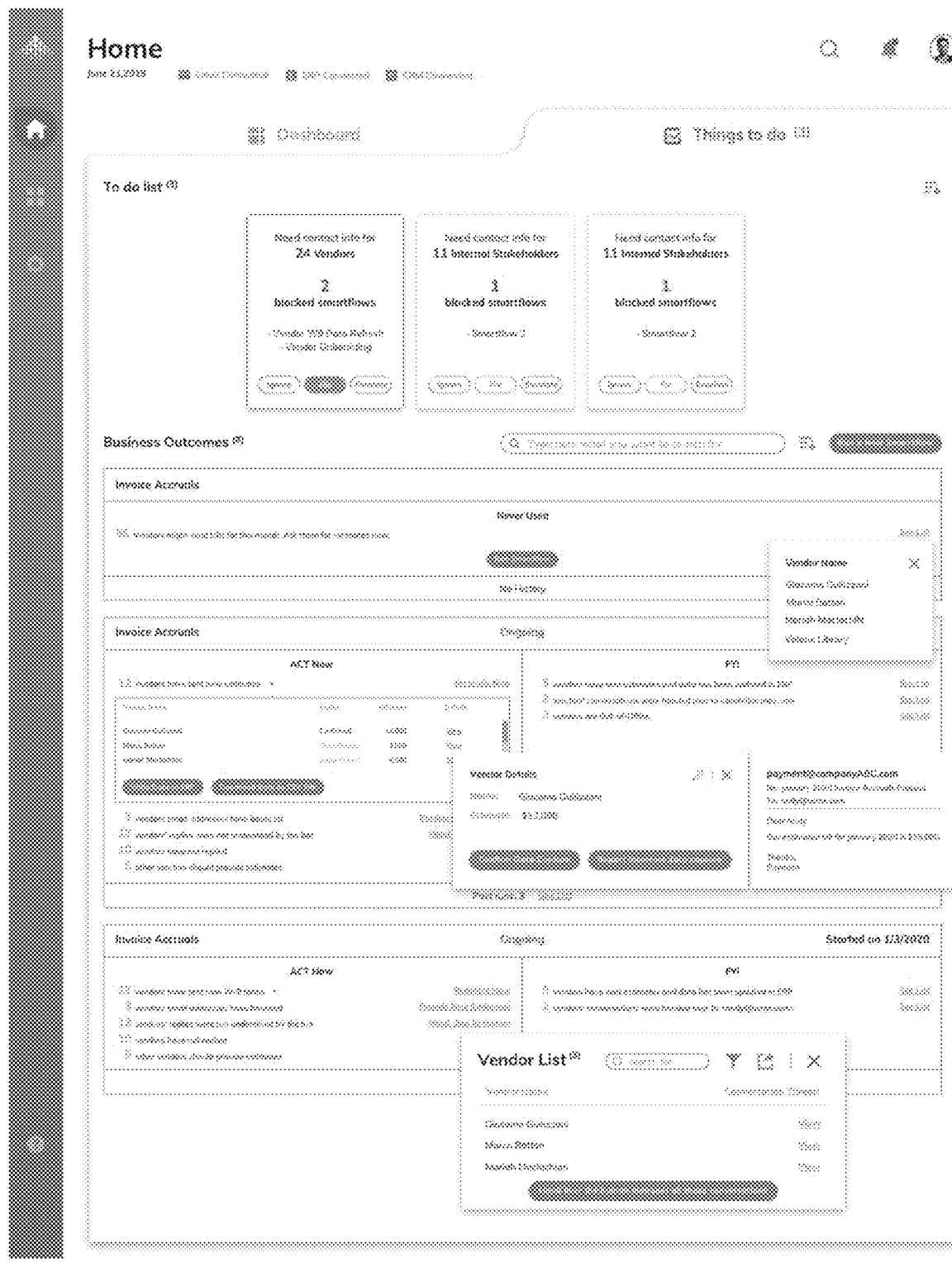

The status of the process may be displayed on a dashboards screen, such as that shown in FIG. 13. The dashboard may show updates such as, but not limited to, number of returned estimates, number of vendors escalated for user supervision, number of vendors unreachable, number of bounced emails, number of replies that could not be understood by the automated process, etc. Additional details can be shown for specific vendors, such as name, estimate amount, and invoice date. The dashboard may provide controls for user input, such as to confirm a data capture for entry or report a data capture as incorrect for follow-up.

Additional smartflows in accordance with embodiments of the invention can include a vendor W9 data refresh that sends emails to request updated W9 forms from vendor accounts. Similar to the process described above with respect to FIGS. 11-13, the vendor W9 data refresh may retrieve and enter updated W9s into the system. A dashboard view of an executing vendor W9 data refresh smartflow is illustrated by example in FIG. 14. While the screens above illustrate specific smartflow processes, one skilled in the art will recognize that any number of smartflow processes may be performed in accordance with embodiments of the invention.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for executing an autonomous business records data process, the method comprising:
   receiving a request from a user account for executing a business records data process, where the business records data process comprises a state model specifying types of input data, execution tasks, and output data while maintaining a current state;
   creating an execution instance of the state model for the requested business records data process and allocating information fields;
   retrieving information to fill the information fields from one or more business records databases; and
   executing the state model of the business records data process;
   wherein retrieving information to fill the information fields further comprises:
      constructing an email to a recipient requesting additional information for at least one of the information fields;
      when an email response to the email is received, where the email response includes text and attached documents, extracting from the email response text and attached documents the additional information for the at least one of the information fields; and
   wherein alternating email communications involving email generation, incoming email intent parsing, information extraction, and record updating are automated without human intervention.

2. The method of claim 1, where at least one business records database includes business records in a unified format.

3. The method of claim 1, wherein constructing an email utilizes natural language models and processing to generate text around information fields to be returned.

4. The method of claim 1, where human review, approval, and information seeking are integrated in the business records data process through a user interface.

5. The method of claim 1, wherein retrieving information to fill the information fields further comprises:

using an application programming interface (API) to construct a request for additional information from an enterprise resource planning (ERP) database system;

sending the request for additional information to the ERP database system;

receiving a response from the ERP database system and extracting the additional information from the response.

\* \* \* \* \*